United States Patent [19]

Jones

[11] Patent Number: 5,500,505
[45] Date of Patent: Mar. 19, 1996

[54] METHOD FOR CUTTING EPOXY/CARBON FIBER COMPOSITE WITH LASERS

[75] Inventor: Marshall G. Jones, Scotia, N.Y.

[73] Assignee: General Electric Company, Schenectady, N.Y.

[21] Appl. No.: 240,051

[22] Filed: May 9, 1994

[51] Int. Cl.⁶ .................................................. B23K 26/00
[52] U.S. Cl. ......................................................... 219/121.72
[58] Field of Search ..................... 219/121.67, 121.72, 219/121.6, 121.61, 121.73, 121.74, 121.84

[56] References Cited

U.S. PATENT DOCUMENTS

| | | | |
|---|---|---|---|
| 3,281,712 | 10/1966 | Koester | 219/121.61 |
| 4,870,244 | 9/1989 | Copley et al. | 219/121.67 |
| 4,908,494 | 3/1990 | Faiz et al. | 219/121.72 |
| 4,976,930 | 12/1990 | Kishida et al. | 219/121.61 |
| 5,140,128 | 8/1992 | Jones et al. | 219/121.72 |
| 5,231,263 | 7/1993 | Kuwabara et al. | 219/121.73 |
| 5,365,032 | 11/1994 | Muller et al. | 219/121.67 |
| 5,368,911 | 11/1994 | Mannava et al. | 428/167 |

FOREIGN PATENT DOCUMENTS

| | | | |
|---|---|---|---|
| 58-20390 | 2/1983 | Japan . | |
| 60-139437 | 7/1985 | Japan . | |
| 60-196283 | 10/1985 | Japan | 219/121.61 |
| 63-97384 | 4/1988 | Japan . | |
| 63-154280 | 6/1988 | Japan | 219/121.72 |
| 2-30389 | 1/1990 | Japan | 219/121.72 |
| 5-192779 | 8/1993 | Japan | 219/121.61 |
| 5-235504 | 9/1993 | Japan . | |

*Primary Examiner*—Geoffrey S. Evans
*Attorney, Agent, or Firm*—Paul R. Webb, II

[57] ABSTRACT

A method for cutting epoxy/carbon fiber composites of carbon fibers in epoxy resin uses a diffraction-limited neodymium (Nd) yttrium-aluminum-garnet (YAG) laser operated in a high peak power Q-switch mode at high pulse rates. The fiber composite is cut with minimal heat affected zone. Selective and multiple wavelength processing are applied for increased coupling efficiency with the epoxy and carbon material components of the composite.

11 Claims, 2 Drawing Sheets

5,500,505

METHOD FOR CUTTING EPOXY/CARBON FIBER COMPOSITE WITH LASERS

TECHNICAL FIELD

The present invention relates to the use of epoxy/carbon fiber composite material and, more particularly, to a method of using a laser or laser/fiber based system for cutting epoxy/carbon fiber composite sheet or ribbon material.

BACKGROUND ART

The use of epoxy/carbon fiber composite material is steadily increasing in the air framer and aircraft engine industries. The labor intensity of applying fiber composite materials in the assembly of air frames and aircraft engines is well known, and it would be desirable to be able to automate some of the necessary functions. A key step in the automating process is cutting the composite material. The challenge is to cut the material, in particular, ribbon, to any required length, while not creating any potential defects at the cut edge. Potential defects at the cut edge can cause potential problems during any automated lamination procedure for fabricating a part, or with the functionality of the resulting part or component.

Since mechanical cutting hardware wears with use, there will be potential maintenance and up-time problems in any automated system. When cutting composite ribbon with mechanical hardware, there is a probable inherent cut length limit that is obtainable. This is a problem when a part is being built up from different composite ribbon cut lengths. Presently, mechanical cutting operations used for epoxy/carbon fiber composite include the use of shears, knives, blades, scissors and diamond-based tools. A large percentage of all composite cutting is performed manually. Some of these manual operations are being evaluated for potential integration into proposed automated systems. Although attempts have been made to use $CO_2$ lasers, water jets, and ultrasonics to cut composite material, these techniques are difficult to integrate into the composite ribbon laminating part of a fabricating machine.

It would be desirable then to have a method for cutting epoxy/carbon fiber composite. It would further be desirable to have such a method wherein the cutting can be accomplished at a high rate without causing any mechanical or heat related defects at the cut edge. It would be desirable to provide such a cutting means which is integrable in an automated environment.

SUMMARY OF THE INVENTION

The present invention is a method for cutting epoxy/carbon fiber composite at a high rate without causing any mechanical or heat related defects at the cut edge. The cutting method herein is particularly well suited for integration into an automated environment.

In accordance with one aspect of the present invention, a non-contact cutting method cuts epoxy/carbon fiber composites at high speeds. Specifically, the cutting method of the present invention uses a diffraction-limited neodymium (Nd) yttrium-aluminum-garnet (YAG) laser operated in a high peak power Q-switch mode at high pulse rates. In this manner, the fiber composite can be cut with a minimal heat affected zone (HAZ). Selective and multiple wavelength processing are accessed to increase coupling efficiency with the epoxy and carbon material components of the composite.

Accordingly, it is an object of the present invention to provide a cutting method that can accomplish cutting of epoxy/carbon fiber composite at a high rate of speed without causing any mechanical or heat related defects at the cut edge. Other objects and advantages of the invention will be apparent from the following description, the accompanying drawings and the appended claims.

DETAILED DESCRIPTION OF THE PREFERRED EMBODIMENTS

The present invention relates to a non-contact approach for cutting epoxy/carbon fiber composites at speeds at least as fast as current mechanical methods. The approach involves the use of a diffraction-limited (TEMOO) neodymium (Nd) yttrium-aluminum-garnet (YAG) laser operated in a Q-switch mode. In applying the laser, different and multiple wavelengths are selected for use in the process. The present invention rapidly cuts epoxy/carbon fiber composite material with minimal damage to the carbon fibers and with minimal curing of the epoxy at the edge of the kerf.

Figure 1:
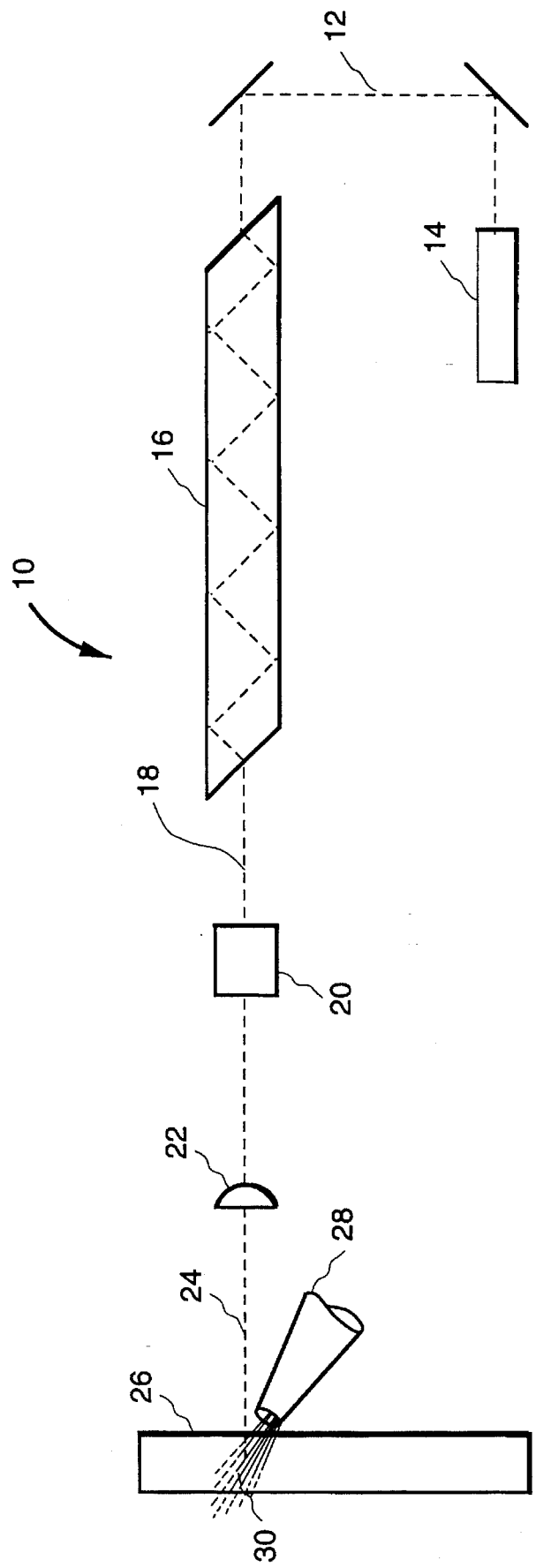
FIG. 1 illustrates a schematic block diagram of a process for cutting epoxy/carbon fiber composite with a laser operated in a high peak power Q-switch mode at high pulse rates.

Referring now to the drawing, FIG. 1 illustrates a schematic block diagram 10 of a process for cutting epoxy/carbon fiber composite with a laser operated in a high peak power Q-switch mode at high pulse rates, in accordance with the present invention. Specifically, a beam 12 from oscillator 14 is applied to an amplifier 16. The oscillator 14 may be any low power oscillator capable of generating a beam that is diffraction limited, i.e., the best available beam, such as a commercially available diffraction-limited Nd:YAG laser or rod laser oscillator. The amplifier 16 may be any suitable amplifier capable of amplifying beam 12 while preserving the beam quality, and is preferably a slab laser amplifier such as has been developed at General Electric Company and is commercially available. The advantage of a slab laser amplifier is that it can maintain the beam quality from the oscillator.

Continuing with FIG. 1, an amplified beam 18 output from amplifier 16 is applied to a Q-switch crystal 20, which may be any suitable commercially available Q-switch device, preferably capable of providing a very short pulse length. For the same energy content, a shorter pulse length pulse has greater peak power than a longer pulse length pulse. The amplified beam 18 is then focused, i.e., reduced in cross-section, at focusing lens 22. The focused beam 24 then cuts the epoxy/carbon fiber composite 26. The epoxy/carbon fiber composite 26 is typically an epoxy/carbon fiber composite ribbon, which may be, for example, 3 mm wide.

In a preferred embodiment, cuts are achieved at average powers greater than 40 watts, with pulse rates greater than 3,000 pulses/second. The peak energy is preferably between six and ten mJ, and cutting speeds are preferably between ten and twenty-five ipm. Cutting is preferably performed in an inert environment, such as a $N_2$ purge. These parameters result in clean cuts with minimal HAZ. When uncured epoxy/carbon fiber composite is used, the uncured epoxy will maintain its adhesion property at the kerf after the laser process according to the preferred parameters. Selective and multiple wavelength processing are accessed and applied for increased coupling efficiency with the epoxy and carbon material components of the composite.

In a first embodiment of the present invention, the composite 26 is cut using a 1.06 micron wavelength from the Nd:YAG laser 14, operated in a Q-switch mode as illustrated in FIG. 1. Typical laser parameters would provide a peak energy range from five to fifteen mJ and a peak power range from $10^5$–$10^6$ watts. A very high power density, or "hot", beam is used to vaporize the material in the kerf during the cutting operation, resulting in a very small HAZ for both the carbon fibers and the epoxy filler. Most of the laser energy couples with the carbon fibers and is subsequently transferred to the epoxy.

In a second embodiment, a frequency doubled, or halved wavelength, from the Q-switch Nd:YAG laser is used. The 0.530 micron wavelength provides improved coupling to the carbon fibers over the 1.06 micron wavelength source. With the same optics, the shorter wavelength also means smaller focused spot size with higher peak power density. A smaller spot size means less material to vaporize in the kerf, which can result in a cleaner cut. Like the 1.06 micron wavelength, most of the 0.530 micron wavelength couples directly into the carbon fibers with the effect on the epoxy being indirect.

In a third embodiment of the present invention, ultraviolet (UV) laser wavelengths are selected for processing the composite material. One type of UV laser is an excimer laser, which provides a choice of four wavelengths (since there are four different UV lines allowing four different wavelengths to be generated depending on the gas mixture selected) while frequency quadrupling the Nd:YAG fundamental wavelength to provide a wavelength of 0.265 microns. During testing, all UV wavelengths coupled effectively with the epoxy. With sufficient peak power, the UV source is adequate to also cut the carbon fibers. In a preferred embodiment, a $TEM_{00}$ beam is used to provide the desired effect on the carbon fibers.

Figure 2:
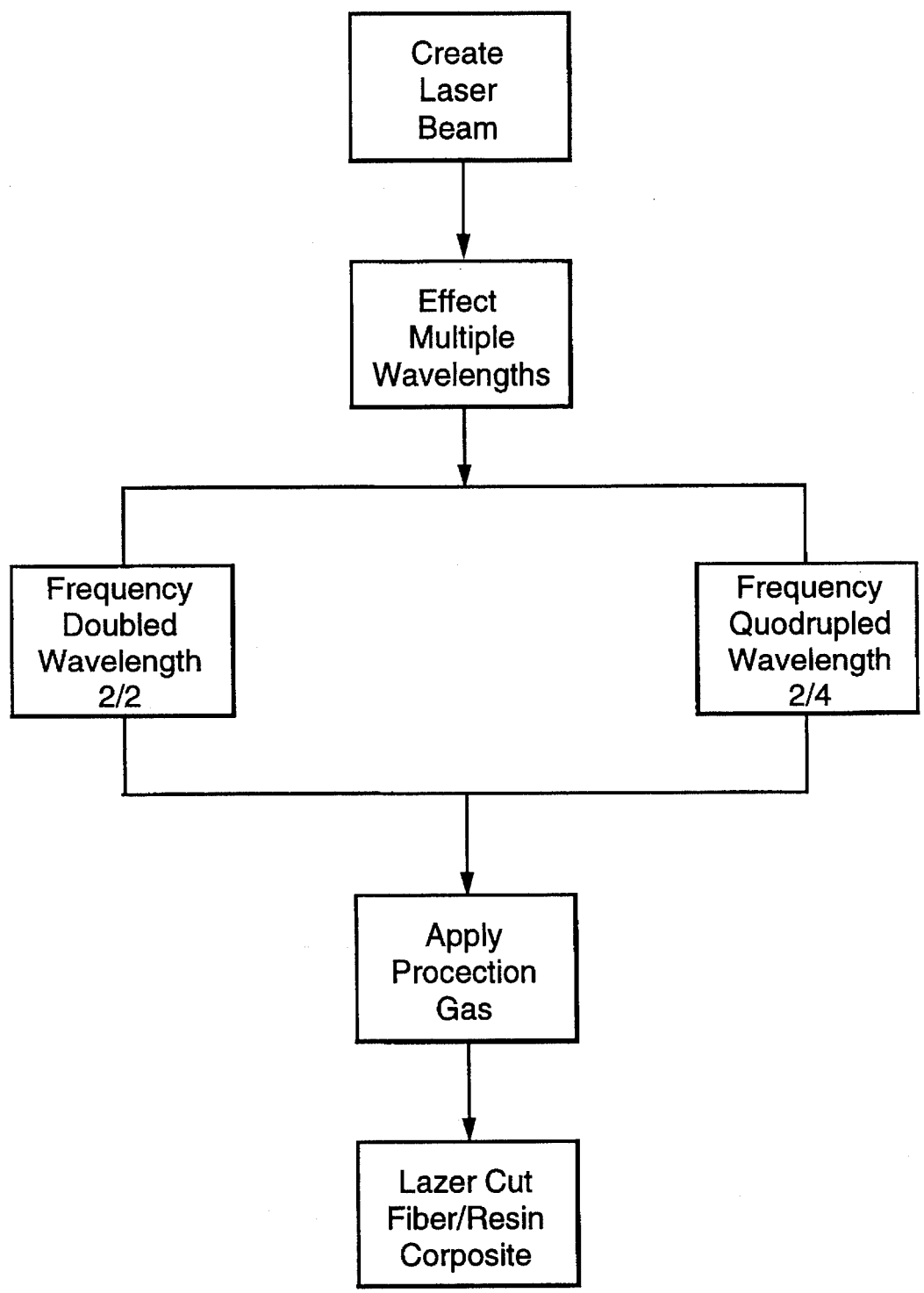
FIG. 2 is a flow chart of the laser cutting process.

In a fourth embodiment of the present invention as shown in FIG. 2, multiple wavelengths are selected from the group consisting of a fundamental wavelength and a frequency multiplied wavelength, such as a frequency doubled or frequency quadrupled wavelength. Using multiple wavelengths allows the materials to be processed to be matched with the best available wavelength. A combination of wavelengths may have potential advantages over any single wavelength operating at $TEM_{00}$, particularly when the composite is comprised of varying materials, since wavelength coupling is material specific.

Several combinations of wavelengths are possible, including, but are not limited to the following. A first combination comprises the fundamental and frequency doubled Nd:YAG wavelengths (i.e., a 1.06 micron wavelength and a 0.530 micron wavelength). This combination provides increased coupling and power density for the same optics because of the shorter wavelength component, since all produced laser energy is used.

For epoxy processing, since UV wavelengths couple better to epoxy, selections wherein the multiple wavelengths include at least one UV wavelength may be preferred. For example, a second combination including the fundamental and frequency quadrupled wavelengths (i.e., a 1.06 micron wavelength and a 0.265 micron wavelength) may be selected. Alternatively, a third combination including frequency doubled and frequency quadrupled wavelengths (i.e., a 0.530 micron wavelength and a 0.265 micron wavelength) may be selected.

Continuing with FIG. 1, a gas nozzle 28, such as a nitrogen ($N_2$) gas nozzle can be included in the process 10, if required to protect the composite during the process. Nitrogen gas 30 emitted from the nozzle 28 changes the environment which the composite material is in. If desired, the nitrogen gas can be used to prevent the formation of oxides in or on the composite material. Hence, cutting can be performed in an inert environment, such as the $N_2$ gas 30 purge.

The present invention can accomplish cutting of epoxy/carbon fiber composite at a high rate of speed without causing any mechanical or heat related defects at the cut edge. A high cut quality is achieved, while minimizing requirements for maintenance due to the cutting operation. The cutting process of the present invention is particularly useful in cutting epoxy/carbon fiber composites for automated part fabrication and as a trimming operation in finishing parts fabricated from composites. The process of the present invention provides the advantage of being integrable in an automated environment.

The wavelength selection is dependent on a number of factors, including the effectiveness with which the laser is functioning. For example, for a less effectively functioning laser, a smaller wavelength, i.e., a 0.530 micron wavelength, may be selected to improve the coupling effect. Conversely, a hotter beam can overcome some amount of non-coupling, allowing the operator to select a longer wavelength, i.e., a 1.06 micron wavelength. The wavelength selected may also depend on the type of epoxy being used, as some epoxies absorb more efficiently than others. Since the coupling ability of the wavelength is material specific, the material and thickness of the composite is also a factor affecting wavelength selection.

The invention has been described in detail with particular reference to certain preferred embodiments thereof, but it will be understood that modifications and variations can be effected within the spirit and scope of the invention.

We claim:

1. A method for cutting a fiber composite material having a fiber and a resin, the method comprising the steps of:

operating a laser in a high peak power Q-switch mode at high pulse rates to create a laser beam;

effecting different and multiple wavelengths in said laser beam, with a first wavelength for increasing coupling efficiency with said fiber, and a second wavelength for increasing coupling efficiency with said resin; and applying the laser beam to the composite material to cut both said fiber and said resin.

2. A method as claimed in claim 1 wherein the laser comprises a diffraction-limited neodymium yttrium-aluminum-garnet laser.

3. A method as claimed in claim 1 wherein said first wavelength is 0.530 micron.

4. A method as claimed in claim 1 wherein said first wavelength is 1.06 micron.

5. A method as claimed in claim 1 wherein said first wavelength is effected by the step of frequency doubling a fundamental wavelength.

6. A method as claimed in claim 1 wherein said second wavelength is effected by the step of frequency quadrupling a fundamental wavelength.

7. A method as claimed in claim 1 wherein said first wavelength is a fundamental wavelength and said second wavelength is a frequency multiplied wavelength.

8. A method as claimed in claim 1 wherein said first wavelength is a frequency doubled wavelength, and said second wavelength is a frequency quadrupled wavelength.

9. A method as claimed in claim 1 further comprising the step of providing a gas to protect the composite material.

10. A method according to claim 1 wherein said composite material is uncured and said first and second wavelengths are selected to minimize heat curing of said resin at said cut.

11. A method according to claim 1 wherein said fiber is carbon and said resin is epoxy.

* * * * *